United States Patent
Zhao et al.

(10) Patent No.: US 10,681,118 B2
(45) Date of Patent: Jun. 9, 2020

(54) METHOD AND APPARATUS FOR DISTRIBUTED DATA PROCESSING

(71) Applicant: EMC IP HOLDING COMPANY LLC, Hopkinton, MA (US)

(72) Inventors: Junping Frank Zhao, Beijing (CN); Fenghao Zhang, Chongqing (CN); Yu Cao, Beijing (CN); Jun Tao, Shanghai (CN); Ricky Yuxi Sun, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 215 days.

(21) Appl. No.: 15/382,887

(22) Filed: Dec. 19, 2016

(65) Prior Publication Data

US 2017/0187792 A1 Jun. 29, 2017

(30) Foreign Application Priority Data

Dec. 28, 2015 (CN) .......................... 2015 1 1001195

(51) Int. Cl.
*G06F 15/16* (2006.01)
*H04L 29/08* (2006.01)
(Continued)

(52) U.S. Cl.
CPC ........ *H04L 67/1008* (2013.01); *H04L 47/783* (2013.01); *H04L 47/803* (2013.01); *H04L 67/1065* (2013.01)

(58) Field of Classification Search
None
See application file for complete search history.

(56) References Cited

U.S. PATENT DOCUMENTS

| 8,074,003 B1 | 12/2011 | Salamon et al. |
| 9,753,761 B1 | 9/2017 | Palekar et al. |

(Continued)

FOREIGN PATENT DOCUMENTS

| CN | 102571567 A | 7/2012 |
| CN | 103714098 A | 4/2014 |

OTHER PUBLICATIONS

First Chinese Office Action (with English translation) dated Nov. 20, 2019 by The Patent Office of the People's Republic of China for Application No. 201511001195.2, filed on Dec. 28, 2015, Serial No. 2019111501645270, 31 pages.

*Primary Examiner* — Brian Whipple
*Assistant Examiner* — Anthony T Rotolo
(74) *Attorney, Agent, or Firm* — BainwoodHuang

(57) ABSTRACT

Embodiments of the present disclosure provide a method and apparatus for distributed data processing. The method comprises: receiving from an upstream node an input message attached with a shared count, the shared count being used for determining a processing status of a root message associated with the input message; processing the input message to generate one or more new messages; allocating to each of the one or more new messages a respective new shared count based on the received shared count; and transmitting the one or more new messages to one or more downstream nodes respectively. Compared with the prior art, the methods and apparatuses for distributed data processing according to the embodiments of the present disclosure can effectively reduce network traffic overheads and the consumed CPU and memory resources, and would be scalable for different topologies of various distributed data processing systems.

14 Claims, 9 Drawing Sheets

(51) Int. Cl.
*H04L 12/911* (2013.01)
*H04L 12/927* (2013.01)

(56) References Cited

U.S. PATENT DOCUMENTS

| | | | | |
|---|---|---|---|---|
| 9,825,865 | B1* | 11/2017 | Sharma | H04L 47/125 |
| 9,858,315 | B2 | 1/2018 | Welton et al. | |
| 10,140,304 | B1 | 11/2018 | Bent et al. | |
| 10,382,202 | B1 | 8/2019 | Ohsie et al. | |
| 2011/0313984 | A1* | 12/2011 | Zhou | G06N 5/003 |
| | | | | 707/704 |
| 2012/0023498 | A1* | 1/2012 | Sundararaman | H04L 47/621 |
| | | | | 718/102 |
| 2013/0204917 | A1* | 8/2013 | Wang | G06F 9/5066 |
| | | | | 709/201 |
| 2014/0215477 | A1* | 7/2014 | Chen | G06F 9/5066 |
| | | | | 718/102 |

* cited by examiner

METHOD AND APPARATUS FOR DISTRIBUTED DATA PROCESSING

RELATED APPLICATIONS

This application claim priority from Chinese Patent Application Number CN201511001195.2, filed on Dec. 28, 2015 at the State Intellectual Property Office, China, titled "METHOD AND DEVICE FOR DISTRIBUTED DATA PROCESSING," the contents of which is herein incorporated by reference in its entirety

FIELD

Embodiments of the present disclosure generally relate to data processing, and more specifically relate to a method and apparatus for distributed data processing.

BACKGROUND

Distributed data processing systems or particularly real-time streaming systems are becoming more and more popular. Modern real-time streaming systems, such as Storm, Pivotal Spring X, Spark Streaming, Samza, and among others, are widely applied to e-commerce, big data analysis, and data Extracting, Transforming and Loading (ETL). It is quite common and important to provide a reliable processing capability so that each message is guaranteed to be processed even with any failure in nodes or networking. One of key challenges for such a distributed system is how to detect a failure existent in the system in an efficient manner with lowest cost and performance impact, particularly for a large system with thousands of nodes and interconnections.

The prior art generally has the following methods to solve the problems above. One method is to report from each processing node to a tracking task a status for each message as issued. Then, the tracking task would maintain the status by tracking the each message as issued and the relationships between nodes. Given a timeout setting, each derived message will be processed. This method is straightforward but inefficient. For each input message, each node will suffer extra report traffic, and the logic for the tracking task will be quite complicated, such that it may possibly consume considerable central processing unit (CPU) and memory resources. As will be described in FIG. 2, another method of improvement is referred to an XOR-based algorithm. This algorithm can dramatically lower the complexity of the tracking task and the consumed memory resources, but still have various problems such as scalable restrictions, considerable network traffic overheads, and end-to-end delay.

Therefore, a more effective and scalable method is desirable in the field to solve the problems above.

SUMMARY

Embodiments of the present disclosure intend to provide a method and apparatus for distributed data processing.

According to a first aspect of the present disclosure, there is provided a method for distributed data processing at a current node, comprising: receiving from an upstream node an input message attached with a shared count, the shared count being used for determining a processing status of a root message associated with the input message; processing the input message to generate one or more new messages; allocating to each of the one or more new messages a respective new shared count based on the received shared count; and transmitting the one or more new messages to one or more downstream nodes respectively.

In some embodiments, the current node is a root node and the receiving an input message comprises: receiving the root message from an external source; and allocating a predetermined shared count for the root message.

In some embodiments, the method further comprises: in response to receiving the root message from the external source, reporting first status information to a tracking task.

In some embodiments, the first status information includes an identifier of the root message, the predetermined shared count and a first operating code, and the first operating code indicates to the tracking task that the predetermined shared count is to be added.

In some embodiments, the current node is a leaf node and the method further comprises: in response to receiving the input message attached with the shared count, reporting second status information to the tracking task.

In some embodiments, the second status information includes an identifier of the root message, the shared count received from the leaf node and a second operating code, and the second operating code indicates to the tracking task that the shared count is to be deducted.

In some embodiments, the allocating to each of the one or more new messages a respective new shared count comprises: allocating the new shared count to the new message based on an allocation policy configured at the current node.

In some embodiments, the allocation policy includes at least one of the following: dividing, based on a number of the one or more downstream nodes, the shared count equally among the one or more new messages; and allocating, based on a weight of each of the one or more downstream nodes, a respective new shared count to each of the one or more new messages.

In some embodiments, the allocating to each of the one or more new messages a respective new shared count comprises: obtaining a total shared count by adding an additional shared count to the shared count; and dividing the total shared count among the one or more new messages.

In some embodiments, the method further comprises: in response to adding the additional shared count to the shared count, reporting third status information to a tracking task.

In some embodiments, the third status information includes an identifier of the root message, the additional shared count and a third operating code, and the third operating code indicates to the tracking task that the additional shared count is to be added.

According to a second aspect of the present disclosure, there is provided a method for distributed data processing at a current node, comprising: receiving status information associated with a root message from a root node and a leaf node; processing, based on an operating code extracted from the status information, a shared count included in the status information to determine a total shared count corresponding to the root message; and determining, based on the total shared count, a processing status of the root message.

In some embodiments, the receiving status information associated with a root message from a root node and a leaf node comprises: receiving first status information from the root node, the first status information including an identifier of the root message, a first shared count allocated to the root message and a first operating code; and receiving second status information from the leaf node, the second status information including the identifier of the root message, a second shared count received by the leaf node and a second operating code.

In some embodiments, the processing a shared count included in the status information comprises: adding the first shared count to the total shared count based on the first operating code; and deducting the second shared count from the total shared count based on the second operating code.

In some embodiments, an initial value of the total shared count is set to zero and the determining a processing status of the root message comprises: in response to the total shared count being zero, determining that processing of the root message succeeds; and in response to the total shared counts being non-zero, determining that a failure occurs during the processing of the root message.

In some embodiments, the method further comprises: receiving third status information from a node added with a third shared count, the third status information including an identifier of the root message, the additional shared count and a third operating code.

In some embodiments, the processing a shared count included in the status information comprises: adding the third shared count to the total shared count based on the third operating code.

According to a third aspect of the present disclosure, there is provided an apparatus for distributed data processing at a current node, comprising: a message receiving module configured to receive from an upstream node an input message attached with a shared count, the shared count being used for determining a processing status of a root message associated with the input message; a message processing module configured to process the input message to generate one or more new messages; a shared count allocating module configured to allocate to each of the one or more new messages a respective new shared count based on the received shared count; and a message transmitting module configured to transmit the one or more new messages to one or more downstream nodes respectively.

In some embodiments, the current node is a root node and the message receiving module is configured to: receive the root message from an external source; and allocate a predetermined shared count for the root message.

In some embodiments, the apparatus further comprises a first reporting module configured to, in response to receiving the root message from the external source, report first status information to a tracking task.

In some embodiments, the first status information includes an identifier of the root message, the predetermined shared count and a first operating code, and the first operating code indicates to the tracking task that the predetermined shared count is to be added.

In some embodiments, the current node is a leaf node and the apparatus further comprises a second reporting module configured to, in response to receiving the input message attached with the shared count, report second status information to the tracking task.

In some embodiments, the second status information includes an identifier of the root message, the shared count received from the leaf node and a second operating code, and the second operating code indicates to the tracking task that the shared count is to be deducted.

In some embodiments, the shared count allocating module is configured to: allocate the new shared count to the new message based on an allocation policy configured at the current node.

In some embodiments, the allocation policy includes at least one of the following: dividing, based on a number of the one or more downstream nodes, the shared count equally among the one or more new messages; and allocating, based on a weight of each of the one or more downstream nodes, a respective new shared count to each of the one or more new messages.

In some embodiments, the shared count allocating module is configured to: obtain a total shared count by adding an additional shared count to the shared count; and divide the total shared count among the one or more new messages.

In some embodiments, the apparatus further comprises a third reporting module configured to, in response to adding the additional shared count to the shared count, report third status information to the tracking task.

In some embodiments, the third status information includes an identifier of the root message, the additional shared count and a third operating code, and the third operating code indicates to the tracking task that the additional shared count is to be added.

According to a fourth aspect of the present disclosure, there is provided an apparatus for distributed data processing at a current node, comprising: a first information receiving module configured to receive status information associated with a root message from a root node and a leaf node; a shared count processing module configured to process, based on an operating code extracted from the status information, a shared count included in the status information to determine a total shared count corresponding to the root message; and a status determining module configured to determine, based on the total shared count, a processing status of the root message.

In some embodiments, the first information receiving module is configured to: receive first status information from the root node, the first status information including an identifier of the root message, a first shared count allocated to the root message and a first operating code; and receive second status information from the leaf node, the second status information including the identifier of the root message, a second shared count received by the leaf node and a second operating code.

In some embodiments, the shared count processing module is configured to: add the first shared count to the total shared count based on the first operating code; and deduct the second shared count from the total shared count based on the second operating code.

In some embodiments, an initial value of the total shared counts corresponding to the root message is set to zero and the status determining module is configured to: in response to the total shared count being zero, determine that processing of the root message succeeds; and in response to the total shared counts being non-zero, determine that a failure occurs during the processing of the root message.

In some embodiments, the apparatus further comprises: a second information receiving module configured to receive third status information from a node added with a third shared count, the third status information including an identifier of the root message, the additional shared count and a third operating code.

In some embodiments, the shared count processing module is configured to: add the third shared count to the total shared count based on the third operating code.

According to a fifth aspect of the present disclosure, there is provided a computer program product for distributed data processing, the computer program product being tangibly stored on a non-transient computer-readable medium and including computer executable instructions which, when being executed, cause the computer to perform any step of any of the methods.

Compared with the prior art, the methods and apparatuses for distributed data processing according to the embodiments of the present disclosure can effectively reduce network traffic overheads and the consumed CPU and memory resources, and would be scalable for different topologies of various distributed data processing systems.

BRIEF DESCRIPTION OF THE DRAWINGS

The accompanying drawings here are used to provide further understanding of the present disclosure, which constitute part of the present disclosure. The schematic embodiments of the present disclosure and their illustrations are used for explaining the present disclosure, not constituting improper limitations to the present disclosure. In the accompanying drawings.

In various drawings, same or corresponding reference numerals represent same or corresponding parts.

DETAILED DESCRIPTION OF THE EMBODIMENTS

Hereinafter, various exemplary embodiments of the present disclosure will be described in detail with reference to the accompanying drawings. It should be noted that these drawings and depictions involve only exemplary embodiments. It should be pointed out that alternative embodiments of the structures and methods disclosed here are easily envisaged according to subsequent depictions, and these alternative embodiments may be used without departing from the principle claimed herein.

It should be understood that these exemplary embodiments are provided only to enable those skilled in the art to better understand and further implement the present disclosure, not limiting the scope of the present disclosure in any manner.

The terms "comprise," "include" and like terms used herein should be understood as open terms, i.e., "including, but not limited to." The term "based on" refers to "at least partially based on." The term "one embodiment" indicates "at least one embodiment"; the term "another embodiment" indicates "at least one further embodiment." Relevant definitions of other terms will be provided in the depiction below.

Figure 1:
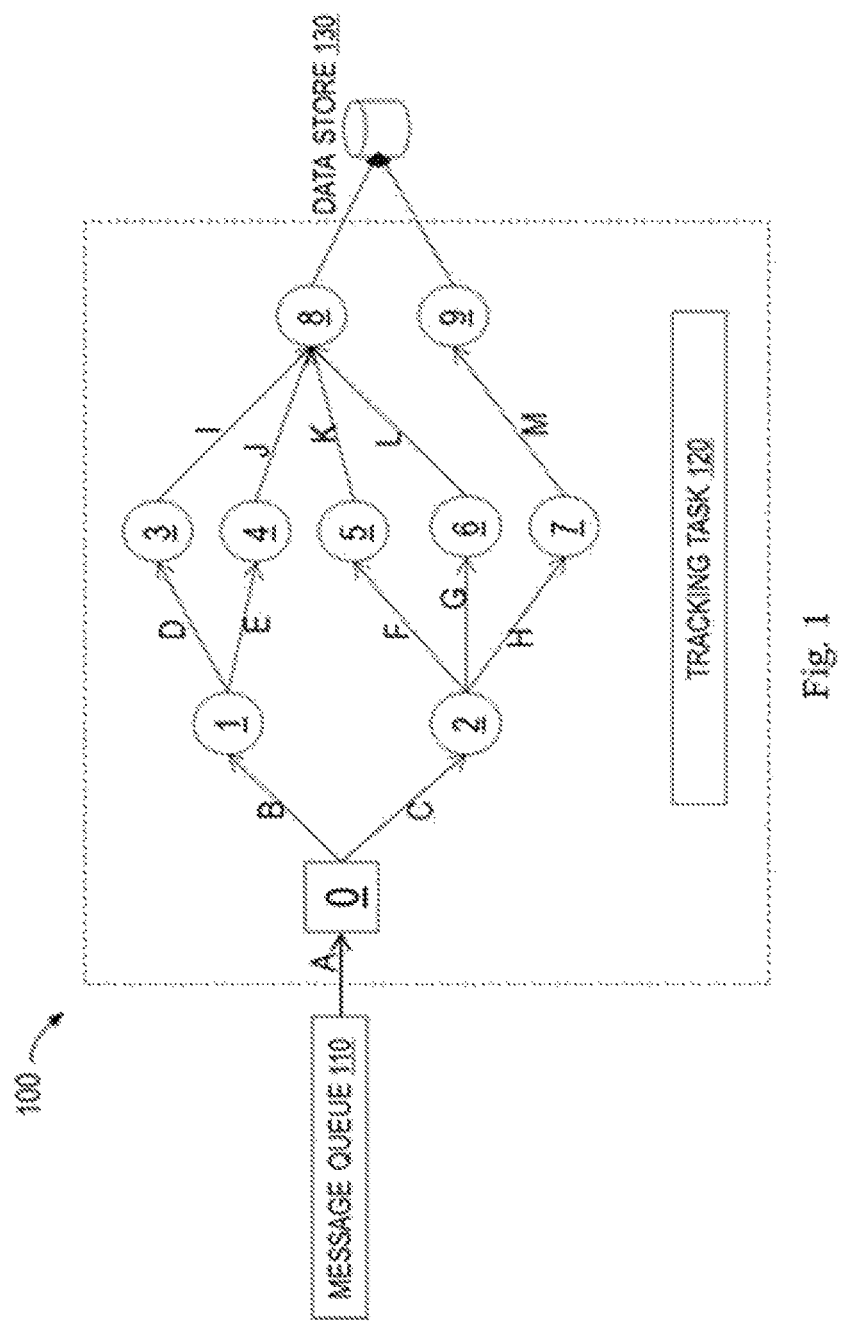
FIG. 1 illustrates an exemplary topology of a distributed data processing system.

FIG. 1 illustrates an exemplary topology 100 of a distributed data processing system.

In order to facilitate the depiction below, explanations of several concepts related to the distributed data processing system will be first provided here:

Topology: an application generally has a topology running as a directional acyclic graph (DAG). A node running a specific logic in the topology is implemented as a process or a thread and is deployed in one or more hosts. An edge in the topology represents a message to be processed. A parent node and a downstream node are of a publish-subscription relationship. More nodes can be added for balance or performance scaling and/or processing pipelines. There are two kinds of nodes for different roles: a root node and a working node.

Root Node: a task initially ingesting messages from an external source, such as a message queue, a log or a database, etc. Here, the ingested original message is referred to as a root message. The root message first enters into a root node. Generally, a topology has a root node, which may have or may not have processing logic. Then, the root node may distribute a generated new message to downstream working nodes.

Working Node: working nodes process input messages and usually generate new messages. Message distribution between nodes is configurable dependent on requirements such as random, shuffle, hash partition, etc. Generally, the working nodes are in-memory processing and have no intermediate data persistency except leaf nodes. The leaf nodes do not generate new messages and optionally store the final result in a persistent store such as Database or a distributed file system.

Tracking Task: a tracking task refers to a centralized monitoring task for tracking processing status of the root message and other system-level statuses like performance.

As shown in FIG. 1, for example, a topology 100 of an exemplary distributed data system may comprise root node 0 and working nodes 1-9. The root message A may enter into the root node 0 in the topology from an external message queue 110. The root node 0 may issue generated new messages B and C to working nodes 1 and 2, respectively. The working nodes 1 and 2 may continue issuing the generated new messages to their respective downstream nodes till the messages reach the leaf nodes 8 and 9. The leaf nodes 8 and 9 may store the final result of the processing in a data store 130. The tracking task 120 may be used for tracking a processing status of a root message including A. It should be understood that the topology of the distributed data processing system as illustrated in FIG. 1 is only exemplary, in which the number of nodes and/or messages as illustrated is only for a purpose of simplifying the explanation, without representing an actual situation in the distributed data processing system. Besides, it should be understood that also for the sake of simplification, FIG. 1 only illustrates components in the distributed data processing system which are related to the embodiments of the present disclosure, rather than all components in the distributed data processing system.

There are two manners for reliable message processing of the distributed data processing system: one is "Exact Once," which means the message is processed exactly once, which is an ideal case; the other manner is "At Least One," which means the message might be processed for more than once. In practice, "at least once" is more feasible (once a failure is detected, simply resend the data and redo everything). Such way is acceptable for some applications (i.e., idempotency) but might be unacceptable for other applications. For the latter case, when the result is persisted at the leaf node, the application will build a logic to detect any duplication and takes actions such as dropping.

However, regardless of which manner, a key challenge lies in detecting a processing failure in a reliable and scalable manner with least cost and performance impact, particularly taking into account possible existence of thousands of or more nodes and end-to-end response time.

As described above, one method of solving the above problem in the prior art is to report from each processing node to a tracking task a status for each message as issued. Then, the tracking task would maintain the status by tracking the each message as issued and the relationships between nodes. Given a timeout setting, each derived message will be processed. This method is straightforward but inefficient. For each input message, each node will suffer extra report traffic, and the logic for the tracking task will be quite complicated, such that it may possibly consume considerable CPU and memory resources. Another improved method is referred to an XOR-based reliability detection algorithm.

Figure 2:
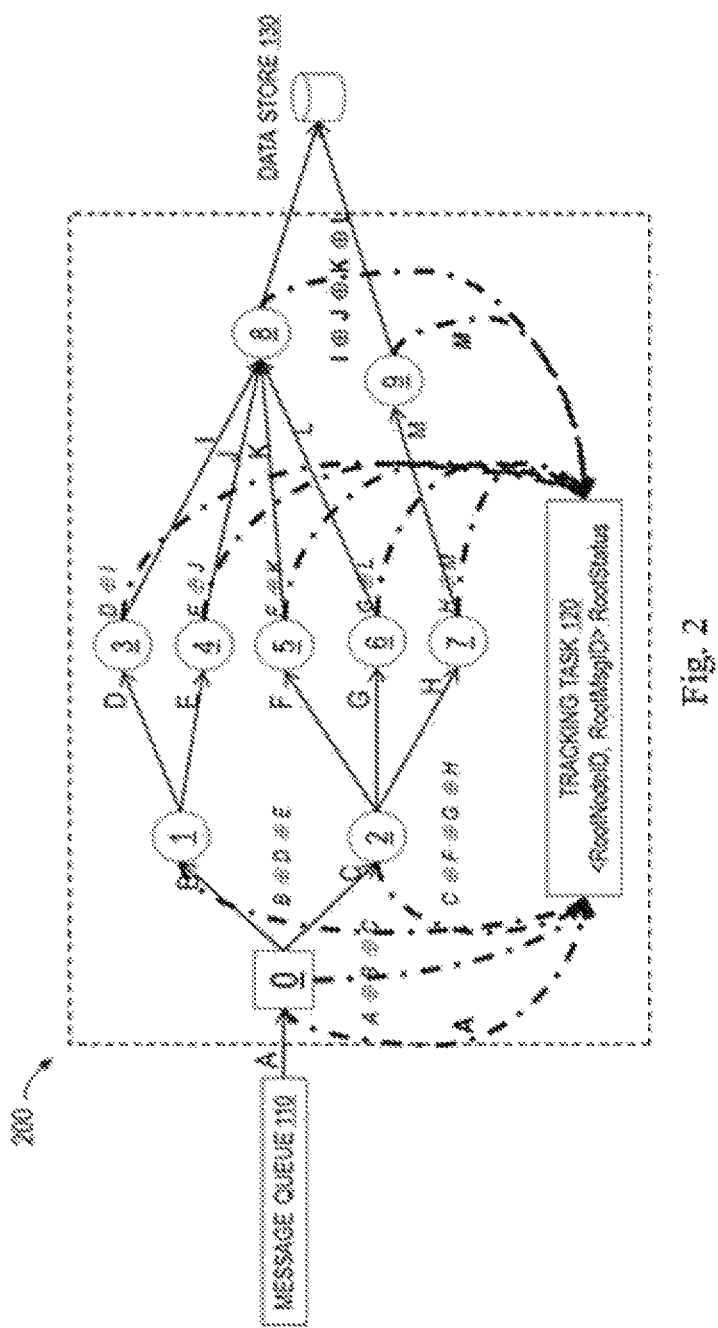
FIG. 2 illustrates a schematic diagram of performing distributed data processing based on an XOR algorithm.

FIG. 2 illustrates a schematic diagram for distributed data processing using an XOR-based algorithm. At the ease of depiction, FIG. 2 illustrates an XOR-based reliability detection algorithm based on the exemplary topology 100 of the distributed data processing system shown in FIG. 1. This algorithm is developed and applied to a real-time streaming system Storm.

Hereinafter, some key design points of the algorithm are provided:

1. Each node, including the root node, has a unique identifier (ID), which is denoted as RootNodeID.

2. Each message (including a root message or a derived message) is designated a randomly generated ID (e.g., 64 bit, so usually unique in a system for many years), and the ID of the root message is denoted as RootMsgID, while the ID of the derived message is denoted as MsgID.

3. Each derived message has metadata embedded in a load, such as RootNodeID. RootMsgID, and its own MsgID, where <RootNodeID, RootMsgID> are used to specify the message origin.

4. For each working node, e.g., once the input message A (denoting MsgID) is received and processed and optionally new messages B and C are issued to downstream nodes, the working node will report a status to the tracking task. The status includes following information: RootNodeID, RootMsgID, LocalStatus=A xor B xor C (xor or ⊕ denotes an XOR operation). If no new message is generated, LocalStatus=A.

5. The tracking task maintains a key-value pair: <RootNodeID, RootMsgID>: RootStatus for the status of each root message (denoted as RootStatus), where <RootNodeID, RootMsgID> is key and RootStatus is value (e.g., 64 bits). Whenever the tracking task receives a status report from a node, it may search the key by the input <RootNodeID, RootMsgID>, and then perform an XOR operation to the input LocalStatus and the corresponding RootStatus to derive a new RootStatus value.

Repeat 4-5 above. Finally, within the set timeout period, the RootStatus value in the tracking task will be zero, while a non-zero value indicates occurrence of a failure.

As illustrated in FIG. 2, the tracking task 120 maintains a key-value pair according to the status of the root message A: <0, A>: RootStatus. For example, the initial value of the RootStatus may be set as RootMsgID, i.e., A; or as shown in FIG. 2, when the root message A enters into node 0, a status information <0, A>: A may be additionally reported to the tracking task 120. FIG. 2 illustrates values of LocalStatus reported by the working nodes 1-8 to the tracking task 120. As shown in FIG. 2, when processing messages I, J, K and L at the node 8, the node 8 may report status information four times to the tracking task 120 in succession (wherein the LocalStatus is I, J, K, and L, respectively); or optionally the four pieces of status information are merged into one status information to be sent (wherein LocalStatus is I xor J xor K xor L). Finally, the tracking task 120 performs XOR to the LocalStatus value corresponding to <0, A> in the received status message, deriving that the RootStatus value corresponding to <0, A> is zero.

A core idea of the XOR-based reliability detection algorithm is the following equation: A xor B xor . . . =0, where A, B and etc. are MsgIDs and in pair. Therefore, ideally, each message is shown as exactly in pair: transmitted once and received once. The receiving order really doesn't matter as long as no timeout. If some message is lost or a node is crashed or timeout happens, a corresponding status report will not be received within a given timeout period, which will inevitably cause that the corresponding RootStatus is non-zero.

However, although the XOR-based reliability detecting method has advantages like simple rules and permission of neglecting intermediate complex logic, this method still has apparent drawbacks. The drawbacks lies in that it still generates considerable extra network traffics, because each node will transmit a status report of certain size via the network for each input message. Moreover, the algorithm cannot be extended well for a large topology, because more nodes and more incoming messages will cause more internal network traffics. The drawbacks also lie in that the issuing of each status report will consume extra memory and CPU resources. In addition, due to the delay caused by memory copy at each node, when thousands of nodes run in the pipeline, the aggregated delay possibly amounts to a considerable millisecond level for such real-time streaming system. Besides, the algorithm uses a 64-bit random number as MsgID and assumes it unique, such that A xor A=0 means the specific message A has been processed. However, a possibility of repetition of random numbers is still existent. When this situation happens, the same MsgID possibly does not represent a same input message. Embodiments of the present disclosure can overcome the drawbacks above existing in the XOR-based reliability detection algorithm.

Figure 3:
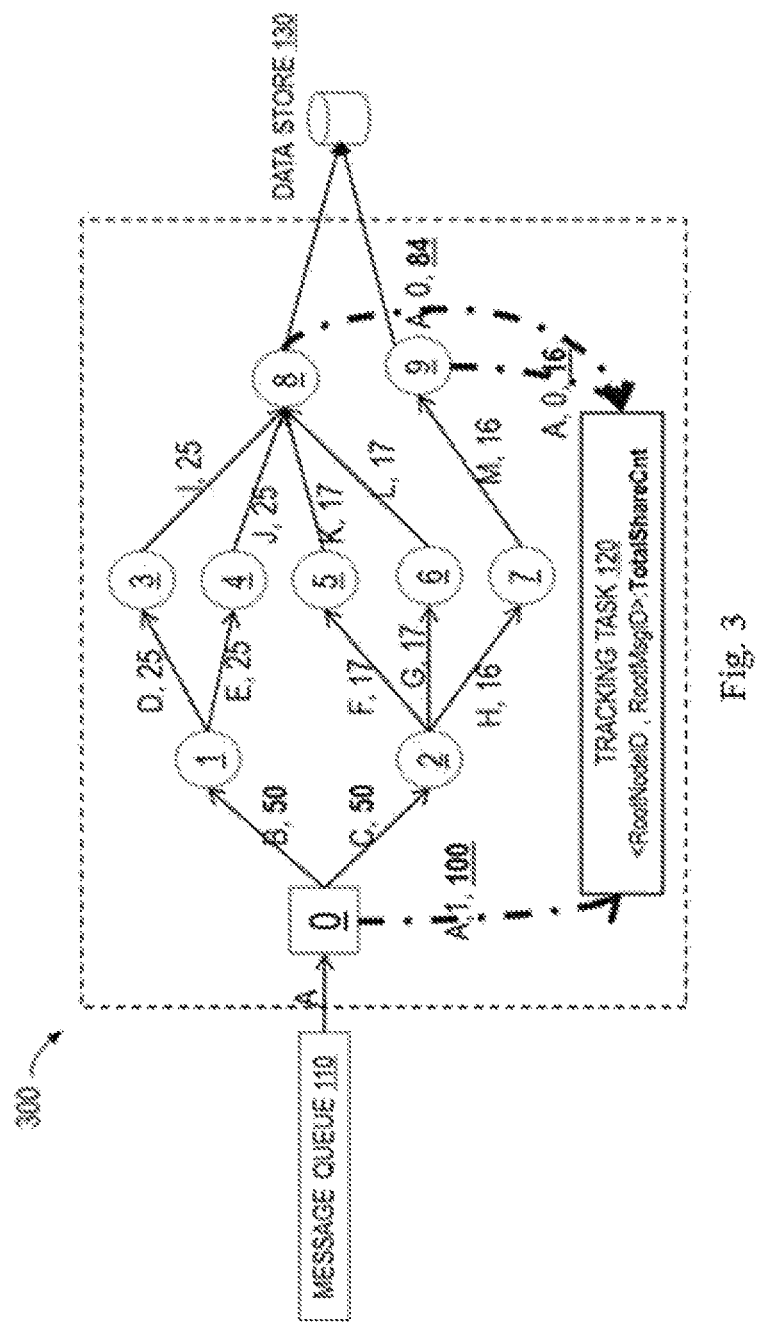
FIG. 3 illustrates a schematic diagram of performing distributed data processing according to the embodiments of the present disclosure.

FIG. 3 illustrates a schematic diagram of performing distributed data processing according to one embodiment of the present disclosure. At the ease of depiction, FIG. 3 still illustrates the embodiments of the present disclosure based on an exemplary topology 100 of the distributed data processing system shown in FIG. 1.

According to the embodiments of the present disclosure, at the root node, each root message coming from the external source may be assigned a MsgID and a large shared count. The MsgID may be a random number or may be incremental constantly and the large shared count may be configurable for each application, e.g., it may be denoted as INIT_SHARE, which may be 32 bits or up to 64 bits. The share count may be embedded in a load of the message and constitute part of metadata. Meanwhile, for each RootMsg, there may be a key-value mapping at the tracking task. The "key" may be identical to the "key" in the XOR-based reliability detection algorithm, while the "value" may be a total shared count (e.g., 64 bit, denoted as TotalShareCnt). The "value" may be initially set to 0. For example, the key-value mapping may be denoted as <RootNodeID, RootMsgID>: TotalShareCnt.

For example, as illustrated in FIG. 3, at the root node 0, the root message A is allocated a shared count 100. That is, INIT_SHARE=100. It should be understood that the shared count value 100 is only for the purpose of illustration. The tracking task maintains a key-value pair for the status of the root message A: <0, A>: TotalShareCnt.

According to the embodiments of the present disclosure, given an input message with a shared count, when new messages are generated at a node, the input shared count will be decomposed and allocated to each of the new messages (e.g., the allocated new shared count may also be embedded as a message load, denoted as ShareCnt). For example, a format of the new message may be: [RootNodeID, RootMsgID, ShareCnt], original message data. The allocation policy for the shared count may be configurable for each node, e.g., it may be divided equally among the new message based on the number of downstream nodes; or a respective new shared count may be allocated to each of the new messages based on a weight of each of the downstream nodes.

For example, as illustrated in FIG. 3, when new messages B and C are generated at node 0, the input shared count 100 may be divided equally among the new messages B and C, i.e., the shared counts of B and C are 100/2=50, respectively. The root node 0 may issue the new messages B and C attached with their respective shared counts to the working nodes 1 and 2, respectively. The working nodes 1 and 2 may continue decomposing the received shared counts and allocate them to derived new messages, and then issue the new messages to their respective downstream nodes, till the messages attached with the shared counts reach the leaf nodes 8 and 9.

According to the embodiments of the present disclosure, the intermediate working nodes needn't report a status to the tracking task through the network, while the root node and the leaf node are responsible for reporting the status to the tracking task. For example, a format of the reported status information may be: RootNodeID, RootMsgID, OpCode, ShareCnt, where the ShareCnt denotes a shared count received by the leaf node with respect to the RootMsgID and the OpCode represents an operating code indicating how the tracking task processes the attached ShareCnt. For example, the OpCode may be represented by a bit, where "0" may indicate that the attached ShareCnt will be deducted from the TotalShareCnt at the tracking task, and "1" may indicate that the attached ShareCnt may be added to the TotalShareCnt at the tracking task. The tracking task may increase or decrease the corresponding TotalShareCnt by ShareCnt according to the OpCode. Within the timeout period, the TotalShareCnt should be zero, which means all of the generated messages have been successfully processed. A non-zero value may signify occurrence of a failure.

For example, as shown in FIG. 3, the root node 0 may report the following status information to the tracking task 120: 0, A, 1, 100 (FIG. 3 omits RootNodeID for the sake of simplification). The leaf node 9 may report the following status information to the tracking task 120: 0, A, 0, 16. The leaf node 8 may report four pieces of status information to the tracking task 120: 0, A, 0, 25; 0, A, 0, 25; 0, A, 0, 17, and 0, A, 0, 17. Alternatively or additionally, the leaf node 8 may also sum the received shared counts, and then report one piece of status information to the tracking task 120: 0, A, 0, 84 (where 84=25+25+17+17). The tracking task 120 may increase or decrease the corresponding TotalShareCnt by ShareCnt according to the received operating code. That is, the TotalShareCnt corresponding to <0, A> is 0 (initial value)+100−84−16=0, indicating that all of the generated messages have been successfully processed.

Figure 4:
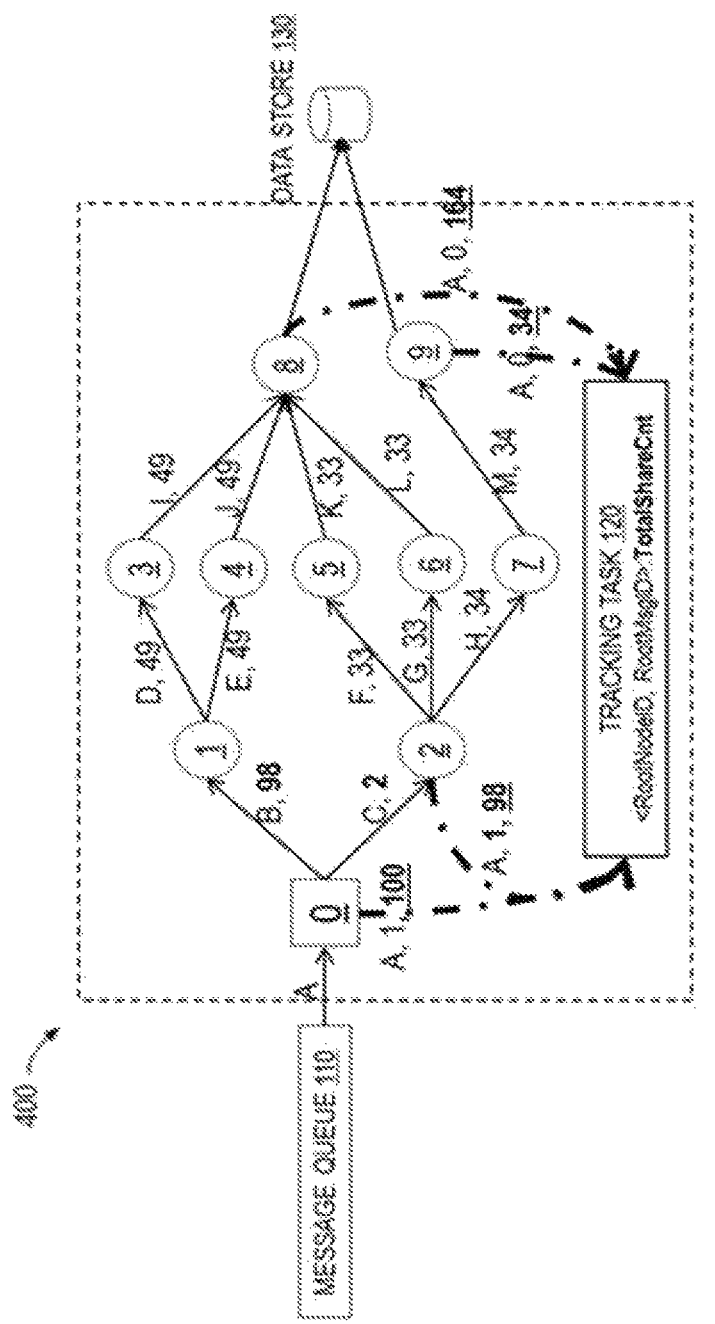
FIG. 4 illustrates a schematic diagram of performing distributed data processing according to the embodiments of the present disclosure.

FIG. 4 illustrates a schematic diagram of distributed data processing according to another embodiment of the present disclosure. At the ease of depiction, FIG. 4 illustrates the another embodiment of the present disclosure still based on the exemplary topology 100 of the distributed data processing system shown in FIG. 1.

As illustrated above with respect to FIG. 3, the INIT_SHARE by default is usually 32-bit, which is enough to support more than 4 billion nodes. However, dependent on the size and shape of a topology and an allocation policy of the shared counts, an intermedia node may not have enough shared counts to perform decomposition. According to the embodiments of the present disclosure, in this case, when new messages are generated at a node, the input shared count may be increased, and the increased total shared count may be divided among the new messages. For example, the node may increase enough shared count till reaching INIT_SHARE. Additionally or alternatively, the node with an increased shared count may report status information to the tracking task to indicate how many shared counts it increases.

As shown in FIG. 4, at the root node 0, a shared count 100 may be allocated to the root message A. That is, the INIT_SHARE=100. The root node 0 may report the following status information to the tracking task 120: 0, A, 1, 100 (FIG. 4 omits RootNodeID for the sake of simplification). When the new messages B and C are generated at the root node 0, the input shared count 100 may be divided among the new messages B and C, such that the shared counts of B and C are 98 and 2, respectively. The root node 0 may issue the new messages B and C attached with their respective shared counts to the working nodes 1 and 2, respectively. The working nodes 1 and 2 may continue decomposing the received shared counts and allocate them to the generated new messages. The working node 2 needs to allocate the received shared counts to nodes 5, 6, and 7. Because the shared count received by the node 2 is 2, it is not enough to be allocated to 3 nodes (suppose a scenario of decimals is not considered). Therefore, the working node 2 may increase the shared count by 98. In other words, the increased total shared count is 2+98=100. Then, the working node may allocate the increased total shared count 100 to the generated new messages F, G. and H, and their respective new shared counts are 33, 33, and 34, respectively. Meanwhile, the node 2 may report the following status information to the tracking task 120: 0, A, 1, 98. Next, repeating the above steps of decomposing the shared count and issuing new messages, till the messages attached with shared counts reach the leaf nodes 8 and 9. The shared count attached to the message M reaching the leaf node 9 is 34, such that the leaf node 9 may report the following status information to the tracking task 120: 0, A, 0, 34. The shared counts attached to messages I, J, K and L reaching leaf node 8 are 49, 49, 33, and 33, respectively, such that the leaf node 8 may sequentially reports four pieces of status information (i.e., 0, A, 0, 49; 0, A, 0, 49; 0, A, 0, 33, and 0, A, 0, 33) to the tracking task 120, or the leaf node 8 may sum the received shared counts and then reports a piece of status information (i.e., 0, A, 0, 164, where 164=49+49+33+33) to the tracking task 120. The tracking task 120 may increase or decrease the corresponding TotalShareCnt by corresponding ShareCnt according to the received operation code. For example, when the initial value of the TotalShareCnt corresponding to <0, A> is set to 0, the final TotalShareCnt is 0+100+98−34=0, indicating that all of the generated messages have been successfully processed.

It may be seen from the examples shown in FIG. 3 and FIG. 4 that the embodiments of the present disclosure may configure an initial shared count and a shared count allocation policy at each node base on the topology size of the distributed storage system. For example, a 4-byte (or even 2-byte) shared count may be allocated to a smaller topology so as to reduce the footprint as much as possible, and meanwhile reduce the CPU resources consumed for processing it as much as possible. The shared count may be embedded in a message load, and transmitted to a downstream node along with the message. Therefore, there is no limitation on the shape of the topology, which enhances the scalability for different topologies. Besides, network traffic for status reporting only occurs at the root node and leaf nodes, which may significantly reduce network traffic overheads. Because there are less number of roof nodes and leaf nodes (generally there is only one root node and one or several leaf nodes), with the intermediate nodes increasing in the topology, the embodiments of the present disclosure will lower more network traffics than the traditional solutions. Meanwhile, compared with the XOR-based algorithm, the embodiments of the present disclosure do not use any random number, which therefore avoids the risk of occurrence of repetition to the random number.

Figure 5:
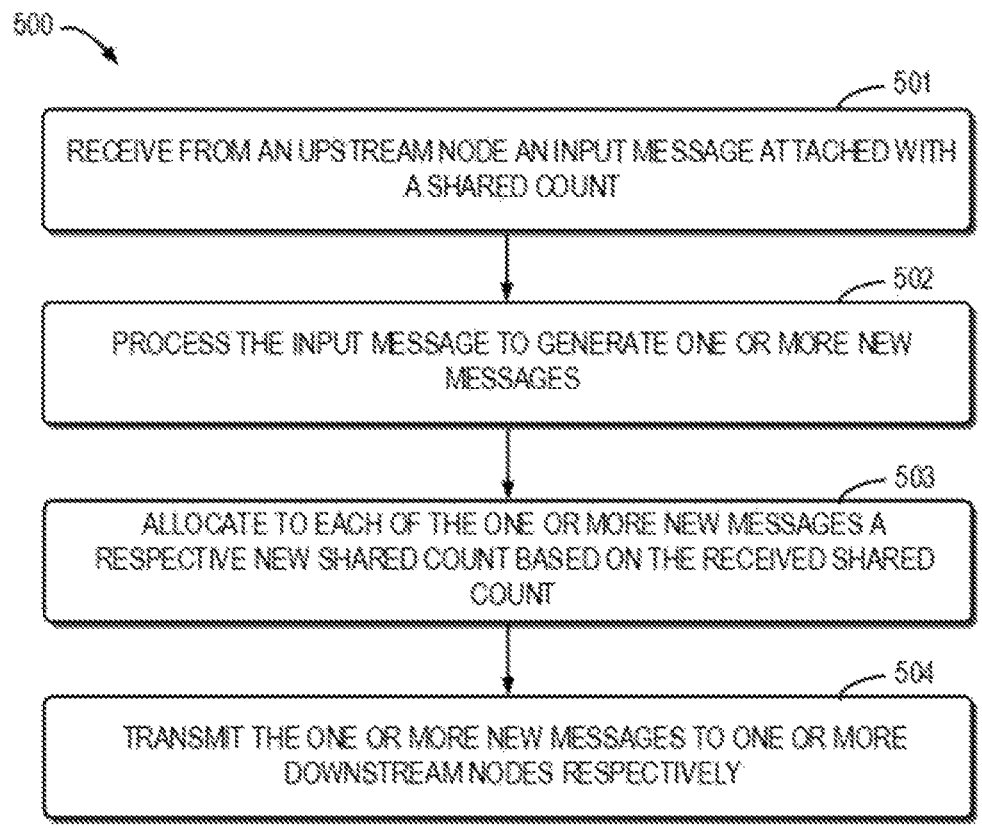
FIG. 5 illustrates a flow diagram of a method 500 for distributed data processing at a current node according to the embodiments of the present disclosure.

FIG. 5 illustrates a flow diagram of a method 500 for distributed data processing at a current node according to the embodiments of the present disclosure. Hereinafter, the method 500 will be described in detail with reference to FIGS. 3 and 4. For example, the method 500 may be implemented on the nodes 0-9 illustrated in FIG. 3 or FIG. 4. The method 500 may comprise steps S501-S504.

In step S501, an input messages attached with a shared count is received from an upstream node. The shared count is used for determining a processing status of a root message associated with the input message. For example, as illustrated in FIG. 3, at the node 1, a message B attached with a shared count 50 is received from the root node 0.

Referring back to FIG. 5, the method 500 proceeds to step S502. In step S502, the input message is processed to generate one or more new messages. For example, as shown in FIG. 3, the node 1 processes the input message B to thereby generate the new messages D and E.

Referring back to FIG. 5, the method 500 proceeds to step S503. In step S503, a respective new shared count is allocated to each of the new messages based on the received shared count. For example, as shown in FIG. 3, the node 1 allocates shared counts 25 and 25 to the generated new messages D and E respectively based on its received shared count 50.

Referring back to FIG. 5, the method 500 proceeds to step S504. In step S504, the the one or more new messages are sent to one or more downstream nodes. For example, as shown in FIG. 3, the node 1 sends the message D attached with the shared count 25 and the message E attached with the shared count 25 to the downstream nodes 3 and 4, respectively.

According to the embodiments of the present disclosure, when the current node is a root node, step S501 may comprise receiving a root message from an external source and allocating a predetermined shared count for the root message. For example, as shown in FIG. 3, the root node 1 receives a root message A from an external message queue, and allocates a predetermined shared count 100 to the root message A.

According to the embodiments of the present disclosure, when the current node is a root node, in response to receiving the root message from the external source, first status information is reported to the tracking task. The first status information may include an identifier of the root message, a predetermined shared count and a first operating code. The first operating code may indicate to the tracking task that the predetermined shared count is to be added. For example, as shown in FIG. 3, the root node 1 reports status information to the tracking task 120, the status information including an identifier (i.e., A) of the root message, a predetermined shared count (i.e., 100) and an operating code (i.e., 1). The operating code "1" indicates that a predetermined shared count (i.e., 100) is to be added to the TotalShareCnt corresponding to <0, A> at the tracking task 120.

According to the embodiments of the present disclosure, when the current node is a leaf node, in response to receiving the input message attached with the shared count, second status information is reported to the tracking task. The second status information includes an identifier of the root message, the shared count received by the leaf node and a second operating code. The second operating code may indicate the track task that the shared count is to be deducted. For example, as shown in FIG. 3, the leaf node 9 reports status information to the tracking task 120. The reported status information includes an identifier (i.e., A) of the root message, the received shared count (i.e., 16) and an operating code (i.e., 0). The operating code "0" indicates that the received shared count (i.e., 16) is to be deducted from the TotalShareCnt corresponding to <0, A> at the tracking task 120.

According to the embodiments of the present disclosure, the step S503 may comprise allocating the new shared count to the new message based on an allocation policy configured at the current node. The allocation policy may include at least one of the following: dividing, based on the number of the downstream nodes, the shared count equally among the new messages; and allocating, based on a weight of each of the downstream nodes, a respective new shared count to each of the new messages. For example, as illustrated in FIG. 3, when the messages B and C are generated at the node 0, the input shared count 100 is divided equally among the messages B and C. That is, the shared counts of B and C are 100/2=50, respectively.

According to the embodiments of the present disclosure, the step S502 may also comprise: obtaining a total shared count by adding an additional shared count to the shared count; and dividing the total shared count among the new messages. For example, as illustrated in FIG. 4, the node 2 needs to allocate the received shared count to the nodes 5, 6, and 7. Because the shared count received by the node 2 is 2, which is not enough to be allocated to three nodes (suppose not considering the scenario of decimals), the node 2 may increase its shared count by 98. That is, the increased total shared count is 2+98=100. Then, the node 2 may allocate the increased total shared count 100 to the messages F, G and H, whose shared counts are 33, 33 and 34, respectively.

According to the embodiments of the present disclosure, the method 500 also comprises reporting third status information to the tracking task in response to adding an additional shared count to the shared count. The third status information may include the identifier of the root message, the additional shared count and a third operating code. The third operating code may indicate the tracking task that the additional shared count is to be added. For example, as shown in FIG. 4, the node 2 reports the status information to the tracking task 120. The reported status information includes the identifier (i.e., A) of the root message, the additional shared count (i.e., 98), and an operating code which indicates that the additional shared count (i.e., 98) is to be added to the TotalShareCnt corresponding to <0, A> at the tracking task 120.

Figure 6:
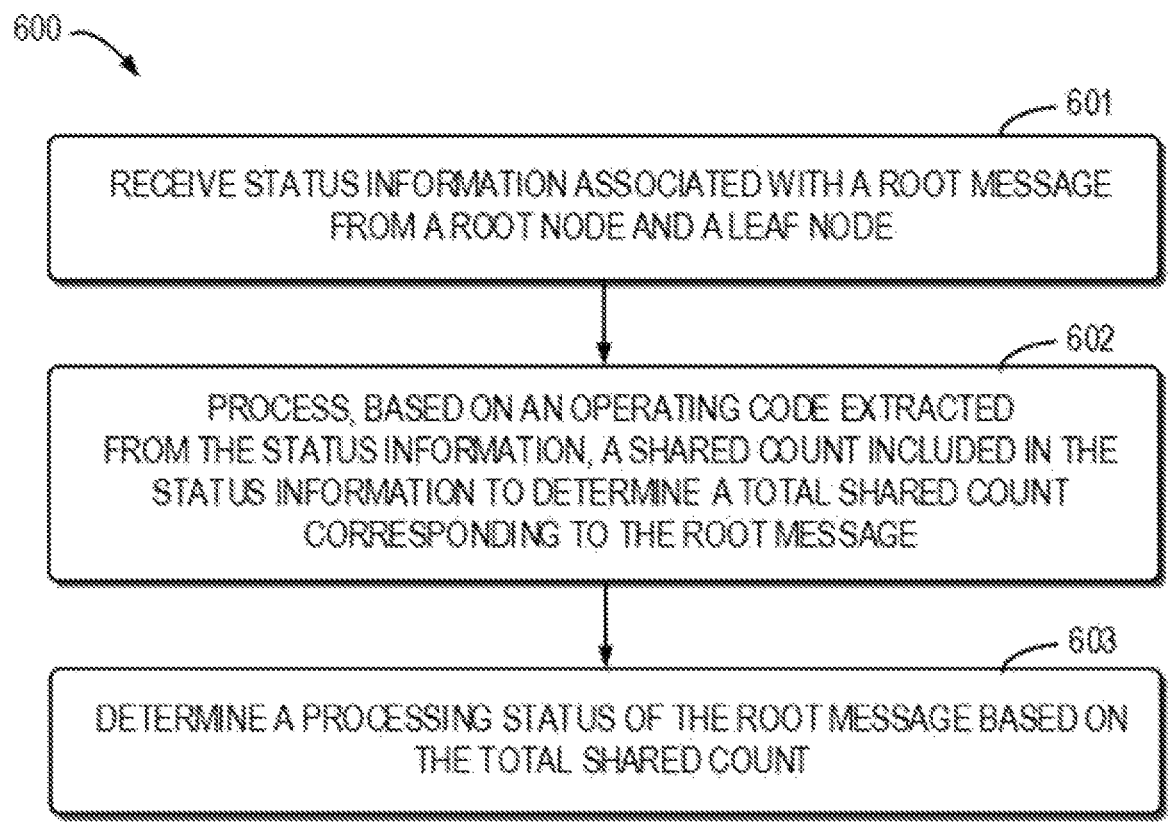
FIG. 6 illustrates a flow diagram of a method 600 for distributed data processing according to the embodiments of the present disclosure.

FIG. 6 illustrates a schematic diagram of a method 600 for distributed data processing according to the embodiments of the present disclosure. Hereinafter, method 600 will be described in detail with reference to FIGS. 3 and 4. For example, the method 600 may be implemented in the tracking task 120 as illustrated in FIG. 3 or FIG. 4. The method 600 may comprise steps S601-S604.

In step S601, status information associated with a root message is received from a root node and a leaf node. According to the embodiments of the present disclosure, the receiving the status information may comprise: receiving first status information from the root node, the first status information including an identifier of the root message, a first shared count allocated to the root message and a first operating code; and receiving second status information from the leaf node, the second status information including the identifier of the root message, a second shared count received by the leaf node and a second operating code. For example, as illustrated in FIG. 3, the tracking task 120 receives status information associated with the root message A from the root node 0 and the leaf nodes 8 and 9. The status information received by the tracking task from the root node 0 may include an identifier (i.e., A) of the root message, a predetermined shared count (i.e., 100) allocated to the root message and an operating code (i.e., 1). The status information received from the leaf node 8 includes the identifier (i.e., A) of the root message, a received shared count (i.e., 84) and an operating code (i.e., 0). The status information received from leaf node 9 includes an identifier (i.e., A) of the root message, a received shared count (i.e., 16) and an operating code (i.e., 0).

Returning to FIG. 6, the method 600 proceeds to step S602. In step S602, the shared count included in the status information is processed based on an operating code extracted from the status information, so as to determine a total shared count corresponding to the root message. According to the embodiments of the present disclosure, processing the shared count may comprise: adding the first shared count to the total shared count based on the first operating code; and deducting the second shared count from the total shared count based on the second operating code. For example, as illustrated in FIG. 3, the status information received by the tracking task 120 from the root node 0 comprises the identifier (i.e., A) of the root message, the predetermined shared count (i.e., 100) allocated to the root message, and an operating code (i.e., 0); the status information received from the leaf node 9 includes an identifier (i.e., A) of the root message, a received shared account (i.e., 16), and an operating code (i.e., 0). In this way, the tracking task 120 may increase or decrease the corresponding TotalShareCnt by corresponding ShareCnt according to the received operating code. For example, when the initial value of the TotalShareCnt corresponding to <0, A> is 0, the final TotalShareCnt is 0+100−84=0.

Returning to FIG. 6, the method 600 proceeds to step S603. In step S603, a processing status of the root message is determined based on the total shared count. For example, according to the embodiments of the present disclosure, an initial value of a total shared count corresponding to the root message may be set to zero and determining a processing status of the root message may comprise: determining that processing of the root message succeeds in response to the total shared count being zero; and determining that failure occurs during the processing of the root message in response to the total shared counts being non-zero. As shown in FIG. 3, the TotalShareCnt corresponding to <0, A> is 0+100−84−16=0, indicating that all of the generated messages have been successfully processed.

According to the embodiments of the present disclosure, the method 600 may also comprise receiving third status information from a node added with an additional shared count. The third status information includes the identifier of the root message, an additional shared count, and a third operating code; and processing the shared count may comprise adding the additional shared count to the total shared count based on the third operating code. For example, as shown in FIG. 4, the shared count of the working node 2 is added by 98, and then the status information is reported to the tracking task. The status information may include the identifier (i.e., A) of the root message, the additional shared count (i.e., 98) and the operating code (i.e., 1). The tracking task may add 98 to the corresponding TotalShareCnt according to the operating code "1" received from the node 2.

For the sake of clarity, some optional steps of methods 500 and 600 are not shown in FIGS. 5 and 6. However, it should be understood that various features described above with reference to FIGS. 3-4 are also applicable to methods 500 and 600.

Figure 7:
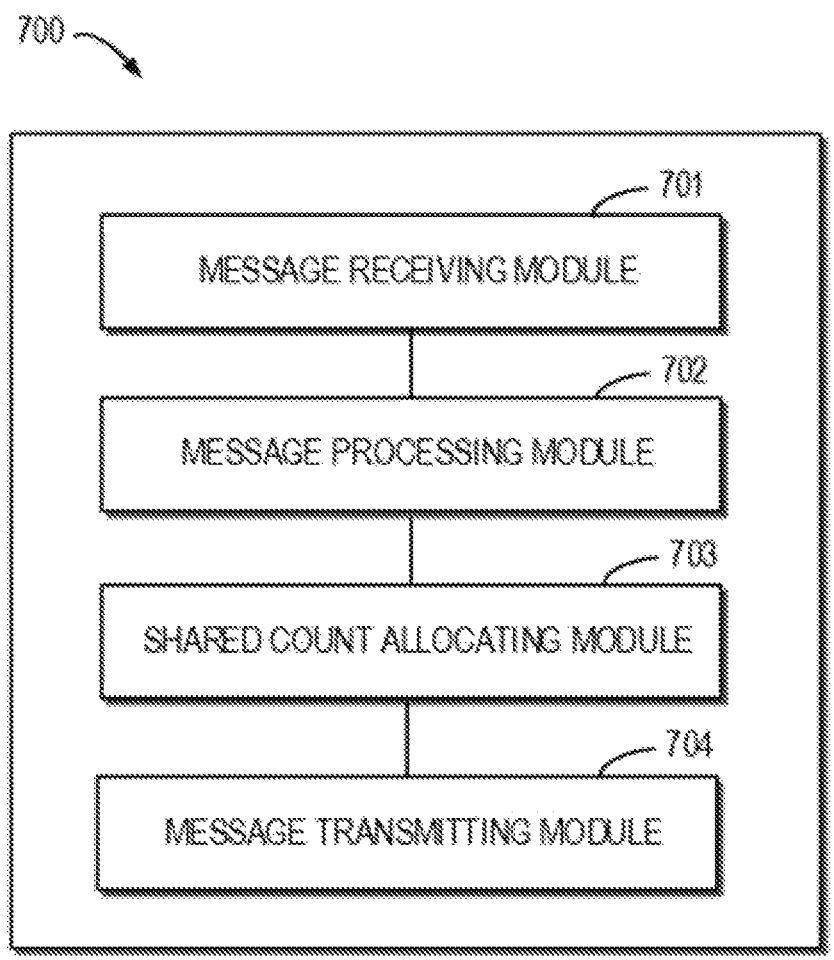
FIG. 7 illustrates a block diagram of an apparatus 700 for distributed data processing at a current node according to the embodiments of the present disclosure.

FIG. 7 illustrates a block diagram of an apparatus 700 for distributed data processing at a current node according to the embodiments of the present disclosure. The apparatus 700 may comprise a message receiving module 701 configured to receive from an upstream node an input message attached with a shared count, the shared count being used for determining a processing status of a root message associated with the input message; a message processing module 702 configured to process the input message to generate one or more new messages; a shared count allocating module 703 configured to allocate to each of the one or more new messages a respective new shared count based on the received shared count; and a message transmitting module 704 configured to transmit the one or more new messages to one or more downstream nodes respectively.

According to the embodiments of the present disclosure, when the current node is a root node, the message receiving module 701 is configured to: receive the root message from an external source; and allocate a predetermined shared count for the root message.

According to the embodiments of the present disclosure, the apparatus 700 further comprises a first reporting module configured to, in response to receiving the root message from the external source, report first status information to a tracking task. The first status information may include an identifier of the root message, the predetermined shared count and a first operating code, and the first operating code indicates to the tracking task that the predetermined shared count is to be added.

According to the embodiments of the present disclosure, when the current node is a leaf node, the apparatus 700 further comprises a second reporting module configured to, in response to receiving the input message attached with the shared count, report second status information to the tracking task. The second status information includes an identifier of the root message, the shared count received from the leaf node and a second operating code, and the second operating code indicates to the tracking task that the shared count is to be deducted.

According to the embodiments of the present disclosure, the shared count allocating module 703 is configured to allocate the new shared count to the new message based on an allocation policy configured at the current node. The allocation policy may include at least one of the following: dividing, based on a number of the one or more downstream nodes, the shared count equally among the one or more new messages; and allocating, based on a weight of each of the one or more downstream nodes, a respective new shared count to each of the one or more new messages.

According to the embodiments of the present disclosure, the shared count allocating module 703 is configured to: obtain a total shared count by adding an additional shared count to the shared count; and divide the total shared count among the one or more new messages.

According to the embodiments of the present disclosure, the apparatus 700 further comprises a third reporting module configured to, in response to adding the additional shared count to the shared count, report third status information to the tracking task. The third status information includes an identifier of the root message, the additional shared count and a third operating code, and the third operating code indicates to the tracking task that the additional shared count is to be added.

Figure 8:
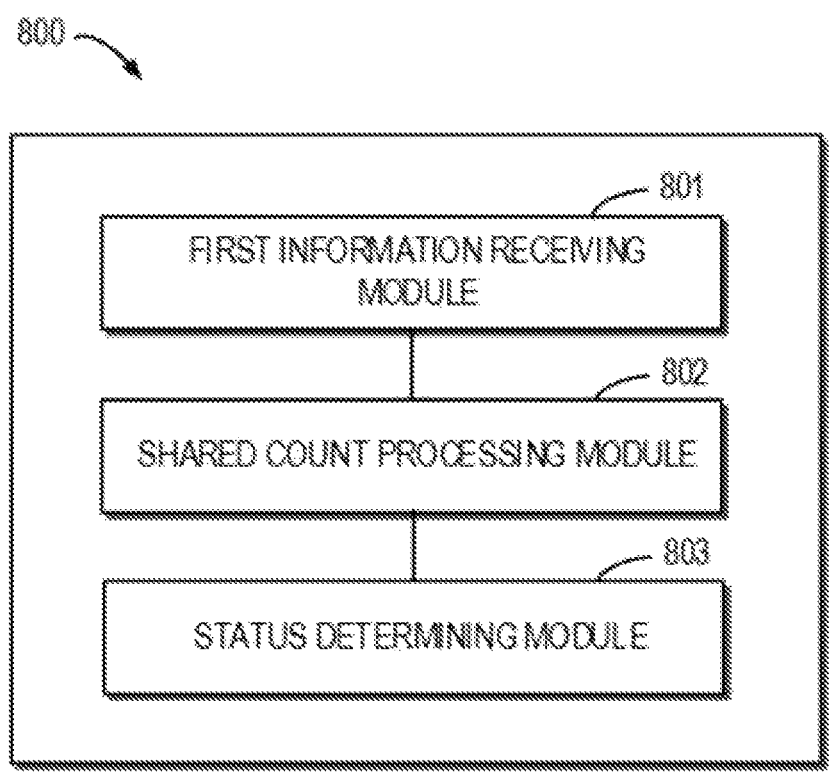
FIG. 8 illustrates a block diagram of an apparatus 800 for distributed data processing according to the embodiments of the present disclosure.

FIG. 8 illustrates a block diagram of an apparatus 800 for distributed data processing according to the embodiments of the present disclosure. The apparatus 800 may comprise: a first information receiving module 801 configured to receive status information associated with a root message from a root node and a leaf node; a shared count processing module 802 configured to process, based on an operating code extracted from the status information, a shared count included in the status information to determine a total shared count corresponding to the root message; and a status determining module 803 configured to determine, based on the total shared count, a processing status of the root message.

According to the embodiments of the present disclosure, the first information receiving module 801 is configured to: receive first status information from the root node, the first status information including an identifier of the root message, a first shared count allocated to the root message and a first operating code; and receive second status information from the leaf node, the second status information including the identifier of the root message, a second shared count received by the leaf node and a second operating code.

According to the embodiments of the present disclosure, the shared count processing module 802 is configured to: based on the first operating code, add the first shared count to the total shared count; and based on the second operating code, deduct the second shared count from the total shared count.

According to the embodiments of the present disclosure, an initial value of the total shared counts corresponding to the root message is set to zero and the status determining module 803 is configured to: in response to the total shared count being zero, determine that processing of the root message succeeds; and in response to the total shared counts being non-zero, determine that a failure occurs during the processing of the root message.

According to the embodiments of the present disclosure, the apparatus 800 further comprises a second information receiving module configured to receive third status information from a node added with additional shared counts. The third status information includes an identifier of the root message, the additional shared counts, and a third operating code.

According to the embodiments of the present disclosure, the shared count processing module 802 is configured to: based on the third operating code, add the additional shared counts to the total shared counts.

For the sake of clarity, some optional modules of the apparatuses 700 and 800 are not shown in FIGS. 7 and 8. However, it should be understood that various features as described above with reference to the present disclosure are likewise applicable to apparatuses 700 and 800. Moreover, respective modules in apparatuses 700 and 800 may be hardware modules or software modules. For example, in some embodiments, the apparatuses 700 and 800 may be partially or completely implemented by software and/or firmware, e.g., implemented as a computer program product embodied on a computer readable medium. Alternatively or additionally, the apparatuses 700 and 800 may be partially or completely implemented based on hardware, e.g., implemented as an integrated circuit (IC), an application-specific integrated circuit (ASIC), a system-on-chip (SOC), a field programmable gate array (FPGA), etc. The scope of the present disclosure is not limited in this aspect.

Figure 9:
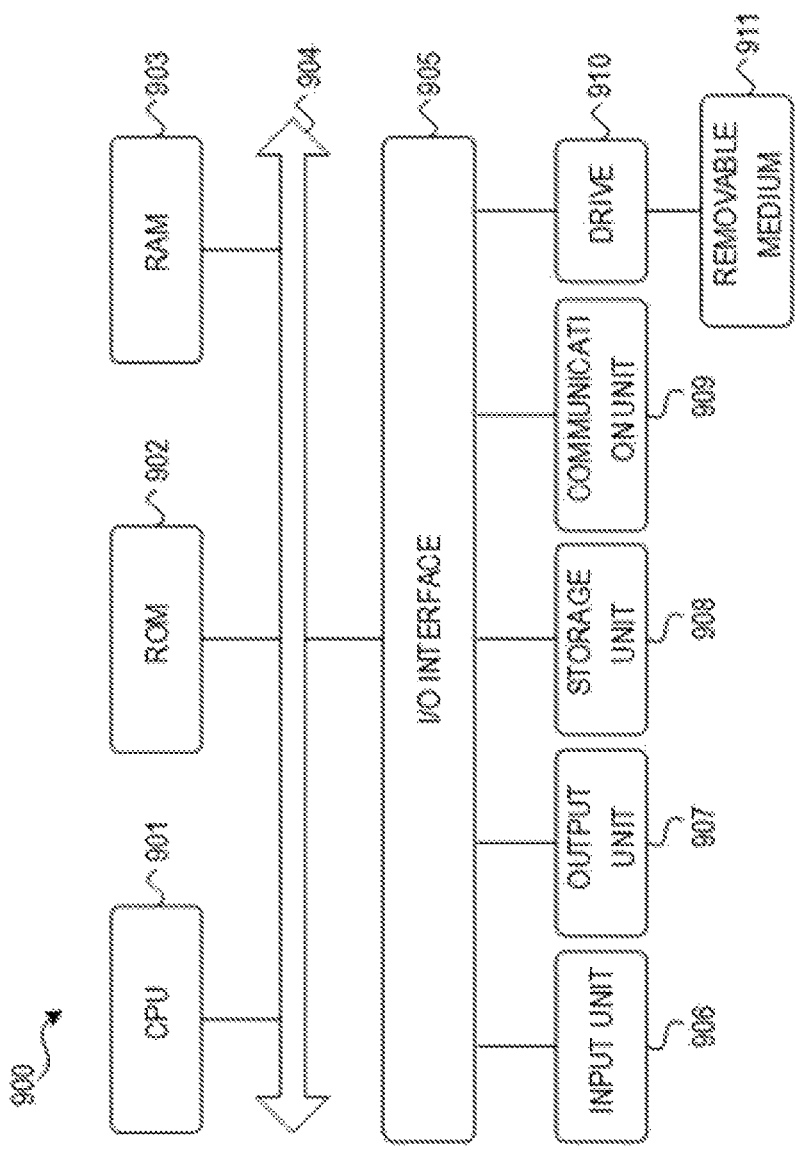
FIG. 9 illustrates a block diagram of a computer system 900 adapted to implement the embodiments of the present disclosure.

Now, refer to FIG. 9, in which a block diagram of a computer system 900 adapted to implement the exemplary embodiments of the present disclosure is presented. As shown in FIG. 9, the computer system 900 comprises a central processing unit (CPU) 901, which may perform any proper actions and processing based on a program stored in a read-only memory (ROM) 902 or a program loaded from a memory section 908 to a random access memory (ROM) 903. In RAM 903, there further store various programs and data needed for operations of the apparatus 700 or apparatus 800. The CPU 901, ROM 902, and RAM 903 are connected to each other via a bus 904. An input/output (I/O) interface 905 is also connected to the bus 904.

The following components are connected to the I/O interface 905: an input part including a keyboard, a mouse and the like; an output part 907 including a cathode ray tube (CRT), a liquid crystal display (LCD) and a loudspeaker, etc.; a memory part 908 including a hard disk, etc.; a communication part 909 including a network interface card such as LAN card, model, etc. The communication part 909 performs communication processing via a network such as Internet. A drive 910 may also be connected to the I/O interface 905 as needed. A removable medium 911, such as a magnetic disk, an optic disk, a magneto-optical disk, a semiconductor memory, and the like, is mounted on the drive 610 as required, such that a computer program read therefrom is mounted in the storage part 908 as required.

In particular, according to the embodiments of the present disclosure, the method 500 described with reference to FIG. 5 and the method 600 described with reference to FIG. 6 may be implemented as computer software programs. For example, embodiments of the present disclosure include a computer program product that is tangibly stored on a non-transient computer-readable medium and comprises a computer executable instruction, the computer executable instruction, when being executed, causes the computer to perform any step of method 500 and/or 600.

In view of the above, according to the embodiments of the present disclosure, there is provided a method and apparatus for distributed data processing. Compared with the prior art, the method and apparatus for distributed data processing can effectively reduce network traffic overheads and the consumed CPU and memory resources, and would be scalable for different topologies of various distributed data processing systems.

Generally, various exemplary embodiments of the present disclosure may be implemented in hardware or a specific circuit, software, logic, or any combination thereof. Some aspects may be implemented in hardware, while other aspects may be implemented in firmware or software executable by a controller, a microprocessor, or other computing device. When various aspects of the embodiments of the present disclosure are illustrated or described with block diagrams, flow diagrams or other graphical representations, it would be appreciated that the blocks, apparatuses, systems, technologies or methods described here may be implemented as non-limitative examples in hardware, software, firmware, specific circuit or logic, general hardware or controller or other computing device, or some combinations thereof.

Moreover, respective blocks in the flow diagram may be regarded as method steps, and/or operations generated by computer program code, and/or understood as a plurality of multiple logical circuit elements for performing relevant functions. For example, embodiments of the present disclosure include a computer program product that includes a computer program tangibly embodied on a machine readable medium, the computer program including program code configured to implement the above described methods.

Within the context of the present disclosure, the machine readable medium may be any tangible medium including or storing programs for or related to the instruction execution system, apparatus, or device. The machine readable medium may include, but not limited to, electronic, magnetic, optical, electro-magnetic, infrared or semiconductor system, apparatus or device, or any combination thereof. Mode detailed examples of the machine-readable storage medium include an electric connection with one or more wires, a portable computer magnetic disk, hard disk, random access memory (RAM), read-only memory (ROM), erasable programmable read-only memory (EPROM or flash memory), optical storage device, magnetic storage device, or any appropriate combination thereof.

The computer program code for implementing the methods of the disclosure may be compiled with one or more programming languages. These computer program code may be provided to a processor of a general computer, a dedicated computer or other programmable data processing device, such that the program code, when being executed by a computer or other programmable data processing device, causes functions/operations specified in the flow diagrams and/or blocks to be implemented. The program code may be executed completely on the computer, partially on the computer, as an independent software packet, partially on the computer while partially on a remote computer, or completely on the remote computer or server.

Additionally, although the operations are described in a specific order, it should not be understood that such operations are performed in the shown specific order or in a successive order, or all of the shown operations are performed to obtain a desired result. In some cases, multi-task or parallel processing would be beneficial. Likewise, although some specific implementation details are included in the above discussion, it should not be explained as limiting the scope of any invention or claims, but should be explained as a depiction that may be directed to a specific embodiment of a specific invention. Some features described in the contexts of separate embodiments may also be consolidated and implemented in a single embodiment. Alternatively, various features depicted in the context of a single embodiment may also be scattered and implemented in a plurality of embodiments or in any appropriate sub-combinations.

Various modifications and changes to the exemplary embodiments of the present disclosure will become apparent to those skilled in the art when viewing the above description along with the accompanying drawings. Any and all modifications will still fall within the scope of the non-limitative exemplary embodiments of the present disclosure. Besides, the above description and drawings have teaching benefits. Those skilled in the art related to these embodiments of the present disclosure will contemplate other embodiments of the present disclosure as illustrated here.

It would be appreciated that the embodiments of the present disclosure are not limited to specific embodiments of the present disclosure, and modifications and other embodiments should all be included within the scope of the appended claims. Although specific terms are used here, they are only used in general and descriptive senses, not for a purpose of limitation.

We claim:

1. A method for distributed data processing at a current node, comprising: receiving from an upstream node an input message attached with a shared count, the shared count being used for determining a processing status of a root message associated with the input message; processing the input message to generate one or more new messages; allocating to each of the one or more new messages a respective new shared count based on the received shared count; and transmitting the one or more new messages to one or more downstream nodes respectively, wherein the current node is one of a root node, a leaf node, and an intermediate working node, wherein, in response to the current node being the root node: the receiving an input message comprises receiving the root message from an external source, allocating a predetermined shared count for the root message, and, in response to receiving the root message from the external source, reporting first status information to a tracking task, wherein, in response to the current node being the leaf node: in response to receiving the input message attached with the shared count, reporting second status information to the tracking task, and wherein, in response to the current node being the intermediate working node: avoiding reporting status information to the tracking task.

2. The method of claim 1, wherein the first status information includes an identifier of the root message, the predetermined shared count and a first operating code, and wherein the first operating code indicates to the tracking task that the predetermined shared count is to be added.

3. The method of claim 1, wherein the second status information includes an identifier of the root message, the shared count received from the leaf node and a second operating code, and wherein the second operating code indicates to the tracking task that the shared count is to be deducted.

4. The method of claim 1, wherein the allocating to each of the one or more new messages a respective new shared count comprises: allocating the new shared count to the new message based on an allocation policy configured at the current node.

5. The method of claim 4, wherein the allocation policy includes at least one of the following: dividing, based on a number of the one or more downstream nodes, the shared count equally among the one or more new messages; and allocating, based on a weight of each of the one or more downstream nodes, a respective new shared count to each of the one or more new messages.

6. The method of claim 1, wherein the allocating to each of the one or more new messages a respective new shared count comprises: obtaining a total shared count by adding an additional shared count to the shared count; and dividing the total shared count among the one or more new messages.

7. The method of claim 6, further comprising: in response to adding the additional shared count to the shared count, reporting third status information to a tracking task.

8. The method of claim 7, wherein the third status information includes an identifier of the root message, the additional shared count and a third operating code, and wherein the third operating code indicates to the tracking task that the additional shared count is to be added.

9. A method for distributed data processing, comprising: in response to receiving, at a root node, a root message from an external source: allocating a predetermined shared count for the root message; and reporting first status information associated with the root message to a tracking task; in response to receiving, at a leaf node, an input message associated with the root message: reporting second status information associated with the root message to the tracking task; receiving, at the tracking task, the first status information associated with the root message from the root node, the first status information including an identifier of the root message, a first shared count allocated to the root message, and a first operating code; receiving, at the tracking task, the second status information associated with the root message from the leaf node, the second status information including the identifier of the root message, a second shared count received by the leaf node, and a second operating code, the first status information and the second status information being received while avoiding receiving at the tracking task status information associated with the root message from an intermediate working node; processing, based on the first operating code and the second operating code included in the first status information and the second status information, respectively, the first shared count and the second shared count to determine a total shared count corresponding to the root message; and determining, based on the total shared count, a processing status of the root message.

10. The method of claim 9, wherein the processing of the first operating code and the second operating code comprises: adding the first shared count to the total shared count based on the first operating code; and deducting the second shared count from the total shared count based on the second operating code.

11. The method of claim 9, wherein an initial value of the total shared count is set to zero and the determining a processing status of the root message comprises: in response to the total shared count being zero, determining that processing of the root message succeeds; and in response to the total shared counts being non-zero, determining that a failure occurs during the processing of the root message.

12. The method of claim 9, further comprising: receiving third status information from a node added with a third shared count, the third status information including an identifier of the root message, the additional shared count and a third operating code.

13. The method of claim 12, wherein the processing of the first operating code and the second operating code comprises: adding the third shared count to the total shared count based on the third operating code.

14. An apparatus for distributed data processing at a current node, comprising: a processor configured to execute a plurality of software modules including a message receiving module, a message processing module, a shared count allocating module, a message transmitting module, and a first reporting module, wherein the processor is configured to execute the message receiving module to receive from an upstream node an input message attached with a shared count, the shared count being used for determining a processing status of a root message associated with the input message; wherein the processor is configured to execute the message processing module to process the input message to generate one or more new messages; wherein the processor is configured to execute the shared count allocating module to allocate to each of the one or more new messages a respective new shared count based on the received shared count; and wherein the processor is configured to execute the message transmitting module to transmit the one or more new messages to one or more downstream nodes respectively, wherein the current node is one of a root node, a leaf node, and an intermediate working node, wherein, in response to the current node being the root node: the processor is further configured to execute the message receiving module to receive the root message from an external source, and allocate a predetermined shared count for the root message; and the processor is configured to execute the first reporting module, in response to receiving the root message from the external source, to report first status information to a tracking task, wherein, in response to the current node being the leaf node: the processor is further configured to execute the first reporting module, in response to receiving the input message attached with the shared count, to report second status information to the tracking task, and wherein, in response to the current node being the intermediate working node: the processor is configured to avoid reporting status information to the tracking task.

* * * * *